US009349055B1

(12) United States Patent
Ogale

(10) Patent No.: US 9,349,055 B1
(45) Date of Patent: May 24, 2016

(54) REAL-TIME IMAGE-BASED VEHICLE DETECTION BASED ON A MULTI-STAGE CLASSIFICATION

(71) Applicant: Google Inc., Mountain View, CA (US)

(72) Inventor: Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 57 days.

(21) Appl. No.: 13/927,225

(22) Filed: Jun. 26, 2013

(51) Int. Cl.
*G06K 9/00* (2006.01)
(52) U.S. Cl.
CPC .................................. *G06K 9/00791* (2013.01)
(58) Field of Classification Search
None
See application file for complete search history.

(56) References Cited

U.S. PATENT DOCUMENTS

| | | | | |
|---|---|---|---|---|
| 8,233,660 | B2* | 7/2012 | Fritsch et al. | 382/103 |
| 8,385,644 | B2* | 2/2013 | Stojancic | 382/170 |
| 8,447,139 | B2* | 5/2013 | Guan | G06K 9/00818 382/224 |
| 2005/0278098 | A1* | 12/2005 | Breed | 701/45 |
| 2007/0127819 | A1* | 6/2007 | Lee | G06F 17/3079 382/190 |
| 2008/0040004 | A1* | 2/2008 | Breed | 701/45 |
| 2010/0079590 | A1* | 4/2010 | Kuehnle et al. | 348/118 |
| 2010/0271502 | A1* | 10/2010 | Phelippeau | G06T 5/20 348/222.1 |
| 2011/0293190 | A1* | 12/2011 | O'Callaghan | 382/197 |
| 2012/0245798 | A1* | 9/2012 | Coats et al. | 701/42 |
| 2014/0176752 | A1* | 6/2014 | Jiang | G06K 9/6217 348/222.1 |

FOREIGN PATENT DOCUMENTS

JP     2004363988     12/2004

OTHER PUBLICATIONS

G. Heitz and D. Koller, "Learning Spatial Context: Using Stuff to Find Things," European Conference on Computer Vision, Oct. 2008.*
A. Petrovskaya, M. Perrollaz, L. Oliveira, L. Spinello, R. Triebel, A. Makris, J.-D. Yoder, C. Laugier, U. Nunes, and P. Bessiere, "Awareness of road scene participants for autonomous driving," in Handbook of Intelligent Vehicles, A. Eskandarian, Ed. Springer London, Jan. 2012, pp. 1383-1432.*

(Continued)

*Primary Examiner* — Matthew Bella
*Assistant Examiner* — Soo Shin
(74) *Attorney, Agent, or Firm* — McDonnell Boehnen Hulbert and Berghoff LLP

(57) ABSTRACT

The present disclosure is directed to an autonomous vehicle having a vehicle control system. The vehicle control system includes a vehicle detection system. The vehicle detection system includes receiving an image of a field of view of the vehicle and identifying a region-pair in the image with a sliding-window filter. The region-pair is made up of a first region and a second region. Each region is determined based on a color of pixels within the sliding-window filter. The vehicle detection system also determines a potential second vehicle in the image based on the region-pair. In response to determining the potential second vehicle in the image, the vehicle detection system performs a multi-stage classification of the image to determine whether the second vehicle is present in the image. Additionally, the vehicle detection system provides instructions to control the first vehicle based at least on the determined second vehicle.

20 Claims, 8 Drawing Sheets

(56) References Cited

OTHER PUBLICATIONS

B Ran and HX Liu, "Development of a Vision-Based Vehicle Detection and Recognition System for Intelligent Vehicles," 1999 TRB Annual Meeting, Nov. 16, 1998.*

Howard, A., "Real-Time Stereo Visual Odometry for Autonomous Ground Vehicles," 2008 IEEE/RSJ International Conference on Intelligent Robots and Systems Acropolis Convention Center, France, Sep. 22-26.

* cited by examiner

COMPUTER PROGRAM PRODUCT 500

SIGNAL BEARING MEDIUM 501

PROGRAM INSTRUCTIONS 502

- RECEIVE AN IMAGE OF A FIELD OF VIEW OF A VEHICLE
- IDENTIFY A REGION-PAIR IN THE IMAGE WITH A SLIDING WINDOW FILTER
- DETERMINE A POTENTIAL SECOND VEHICLE IN THE IMAGE BASED ON THE REGION-PAIR
- PERFORMING A MULTI-STAGE CLASSIFICATION OF THE IMAGE TO DETERMINE IF A SECOND VEHICLE IS PRESENT
- PROVIDE INSTRUCTIONS TO CONTROL THE FIRST VEHICLE BASED AT LEAST ON THE SECOND VEHICLE BEING DETERMINED TO BE PRESENT IN THE IMAGE

| COMPUTER READABLE MEDIUM 503 | COMPUTER RECORDABLE MEDIUM 504 | COMMUNICATIONS MEDIUM 505 |

FIG. 5

REAL-TIME IMAGE-BASED VEHICLE DETECTION BASED ON A MULTI-STAGE CLASSIFICATION

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In order to aid the vehicle control system, an autonomous vehicle includes a vehicle detection system. The vehicle detection system may be operated in various modes and with various configurations based on the intended use and operating conditions.

A first aspect of the present disclosure provides a method. The method includes receiving, from an image-capture device coupled to a first vehicle, an image of a field of view of the vehicle and identifying a region-pair in the image with a sliding-window filter. The region-pair is made up of a first region of the captured image and a second region of the captured image. Each region of the captured image is determined based on a color of pixels within the sliding-window filter at a given location within the captured image. The method also determines a potential second vehicle in the captured image based on the region-pair. In response to determining the potential second vehicle in the captured image, the method performs a multi-stage classification of the image to determine whether the potential second vehicle in the captured image is actually a second vehicle is present in the captured image. The multi-stage classification is ended based on a given stage resulting in a determination of an absence of a second vehicle in the captured image. Additionally, the method provides instructions to control, using a computing device, the first vehicle based at least on the second vehicle being determined to be present in the captured image.

In some examples, the sliding-window filter defines a plurality of regions based on the color of pixels within the sliding-window filter, each at a respective location within the captured image. In some examples, determining a potential second vehicle comprises comparing a difference in the color of pixels between the first region and the second region. In some examples, when determining a potential second vehicle, the method detects an edge between the first region and the second region. Additionally, a size of the sliding-window filter may be based on a location on the image. The multi-stage classification of the image includes the method performing a plurality of classifications on the image. Each classification performs more advanced and computationally intensive vehicle detection than the sliding-window filter. In various examples, controlling the first vehicle based on the second vehicle being determined to be present in the image includes one or more of: reducing a speed of the first vehicle, maintaining a predetermined safe distance from the second vehicle, avoiding being in a blind spot of the second vehicle, changing lanes to move away from the second vehicle, and stopping the first vehicle.

In another aspect, the present application describes a control system. The control system includes at least one processor and a memory. The memory has stored thereon instructions that, upon execution by the at least one processor, cause the control system to perform functions. The functions include receiving, from an image-capture device coupled to a first vehicle, an image of a field of view of the first vehicle. The functions also include identifying a region-pair in the image with a sliding-window filter. The region-pair is made up of a first region of the captured image and a second region of the captured image. Each region of the captured image is determined based on a color of pixels within the sliding-window filter at a given location of the captured image. The functions also include determining a potential second vehicle in the captured image based on the region-pair. In response to determining the potential second vehicle in the captured image, the instructions include performing a multi-stage classification of the captured image to determine whether the potential second vehicle is an actual vehicle present in the captured image. The multi-stage classification is ended based on a given stage resulting in a determination of an absence of the second vehicle in the image. Additionally, the functions provide instructions to control, using a computing device, the first vehicle based at least on the second vehicle being determined to be present in the captured image.

As previously stated with respect to the method, in some examples, the sliding-window filter defines a plurality of regions based on the color of pixels within the sliding-window filter, each at a respective location within the captured image. In some examples, determining a potential second vehicle comprises comparing a difference in the color of pixels between the first region and the second region. In some examples, when determining a potential second vehicle, the function detects an edge between the first region and the second region. Additionally, a size of the sliding-window filter may be based on a location on the image. The multi-stage classification of the image includes the functions for performing a plurality of classifications on the image. Each classification performs more advanced and computationally intensive vehicle detection than the sliding-window filter. In various examples, providing instructions to control comprises providing instructions to perform one or more of: reducing a speed of the first vehicle, maintaining a predetermined safe distance from the second vehicle, avoiding being in a blind spot of the second vehicle, changing lanes to move away from the second vehicle, and stopping the first vehicle.

In yet another aspect, the present disclosure includes a non-transitory computer readable medium having stored thereon instructions, that when executed by a computing device, cause the computing device to perform functions. The functions include receiving, from an image-capture device coupled to a first vehicle, an image of a field of view of the first vehicle. The functions also include receiving, from an image-capture device coupled to a first vehicle, an image of a field of view of the vehicle and identifying a region-pair in the image with a sliding-window filter. The region-pair is made up of a first region of the captured image and a second region of the captured image. Each region of the captured image is determined based on a color of pixels within the sliding-window filter at a given location within the captured image. The functions also include determining a potential second vehicle in the captured image based on the region-pair. In response to determining the potential second vehicle in the captured image, the instructions include performing a multi-stage classification of the captured image to determine whether the second vehicle is present in the captured image. The multi-stage classification is ended based on a given stage resulting in a determination of an absence of the second vehicle in the image. Additionally, the functions provide instructions to control, using a computing device, the first vehicle based at least on the second vehicle being determined to be present in the captured image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 5 illustrates an example computer readable medium configured for real-time image-based car detection.

DETAILED DESCRIPTION

Figure 1:
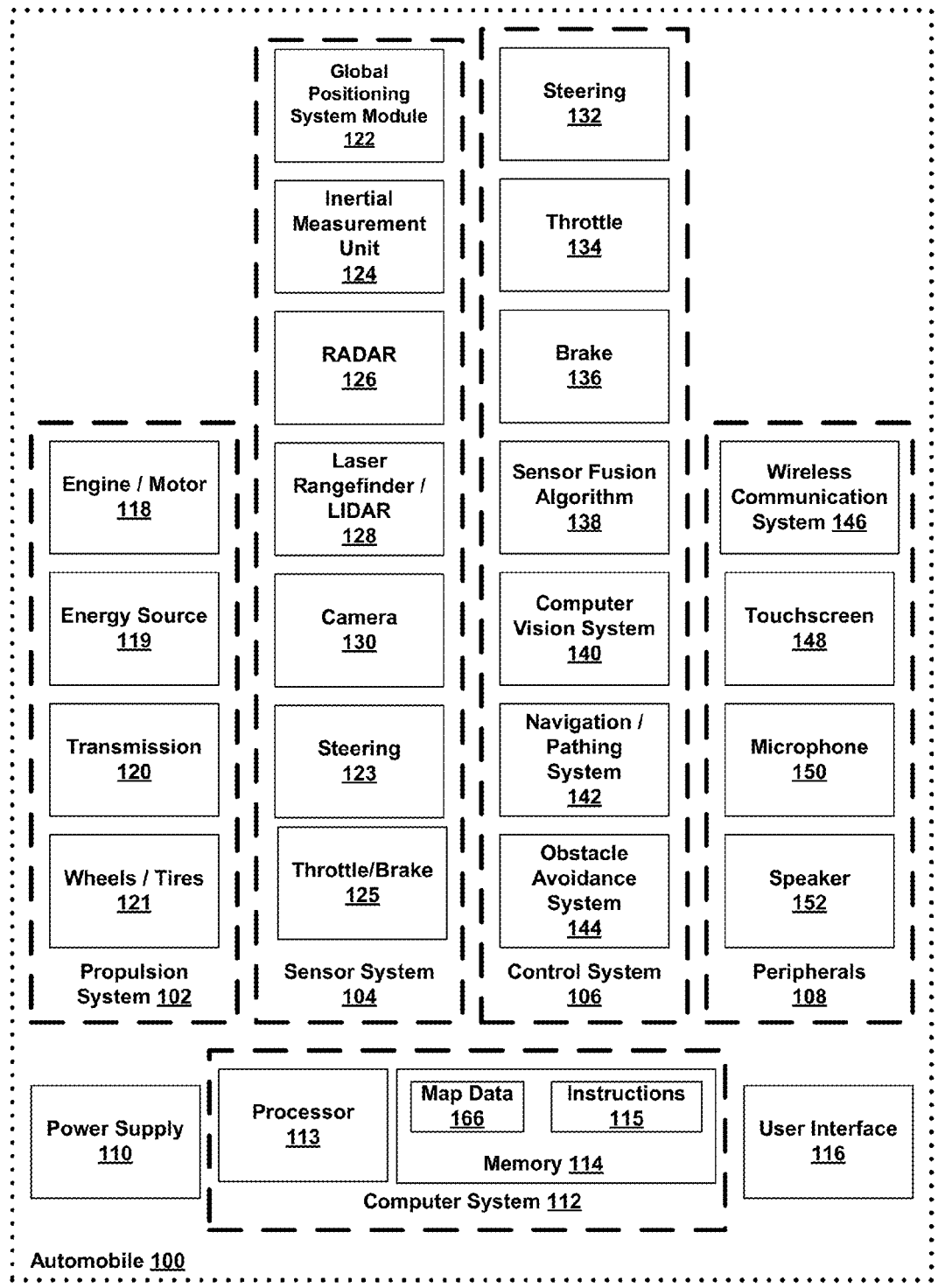
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An example embodiment involves an autonomous vehicle configured with an imaging system. The imaging system may include a camera configured to capture images, video, or both images and video. The captured images and video are stored in a memory for processing. Some or all of the captured images may be forward-facing images of a field of view of the vehicle. For example, some of the images captured by the imaging system may resemble the view a driver of the vehicle may see as the driver operates the vehicle. Additional images may capture side and rear views from the vehicle as well.

A processing system in the vehicle is configured to detect cars in the captured images and video. The processing system detects cars by first defining at least one sliding-window filter for a captured image. The sliding-window filter is a predefined number and arrangement of pixels. The sliding-window filter may be iteratively varied in size and shape. In one example, a sliding-window filter may measure 20 pixels in the vertical direction and 100 pixels in the horizontal direction. The size of the sliding-window filter may be adjusted based on either a location of the sliding-window filter on a captured image or on the iteration of the computing device using the sliding-window filter to analyze the image.

In one embodiment, a computing device uses the sliding-window filter to analyze the color of the space contained within the sliding-window filter. The color of the space within the sliding-window filter, the shape of the sliding-window filter, and the location of the sliding-window filter may define a region. The computing device may use the sliding-window filter to iteratively analyze portions of the captured image by determining a color within the sliding-window filter, then moving to a new position on the image and determining the color within the sliding-window filter again. Thus, the sliding-window filter may determine a plurality of regions. This process may be repeated over the entire image. In one embodiment, after each determination, the sliding-window filter is adjusted by one (or more) pixel in either a vertical or horizontal direction. This process is repeated until the sliding-window filter cannot move further within the extent of the image (e.g. the sliding-window filter has scanned a full line). After a line has been scanned, the sliding-window filter may return to the beginning of the line, but be adjusted by one (or more) pixel in a direction perpendicular to the scan line. In some embodiments, with each iteration, the pixel increment may be one pixel. However, in other embodiments, different value pixel increments may be used.

The sliding-window filter will be used to define a plurality of region-pairs (e.g. a pair of regions), where each region-pair is defined based on a color of each respective region of the region-pair. A region-pair is two regions that are analyzed simultaneously. The region-pair is analyzed based on both the size and shape of the boxes as well as the color within each box. Based on an analysis of a plurality of region-pairs, the image may be determined to contain a car. The plurality of region-pairs may be compared to each other in at least one of two ways. First, the color of each of the boxes in the pair may be analyzed and compared to the color of known region-pairs. If a match is found, the image may contain a car.

Second, an edge detection algorithm may be run on each region-pair (and the space between each region-pair). The detected edges and associated region-pairs are compared to a database of edges and region-pairs associated with cars. The analysis of region-pairs may quickly identify whether or not the image may potentially contain a car. For example, a first region of the region-pair may correspond to a rear bumper of a car and the second region may correspond to the ground below the car. The edge detection algorithm determines whether there is an edge in the image between the two regions of the region-pair. In the example, an edge would be detected between the car bumper and the ground.

After the sliding-window filter process has been completed for an image, the image will be qualified as either not containing a car or possibly containing a car. In some embodiments, the sliding-window filter process may be considered a prequalification for the image. Images that possibly contain a car may be processed further. Conversely, images that do not contain a car will not need to be processed further. By performing the prequalification for the image with the sliding-window filter process, the total processor usage for car detection may be significantly reduced compared to other car-detection methods.

Further processing includes a multiple-stage classifier designed to more precisely identify cars in the image. Each stage in the classifier may require an increase in CPU usage, but also may more precisely be able to identify a car. Each classifier stage may perform a specific car-detection function on the image. Each classifier stage may use more processing power than the sliding-window filter process requires. The classifier stages will analyze images that possibly contain cars in more detail than the sliding-window filter process. However, if a specific stage of the classifier determines no car is present, the process may stop running the classifier to reduce processor usage. Therefore, the classifier stages make the determination whether a car is present in the images or not.

A control system of the vehicle may responsively adjust the vehicle control when vehicles are detected in the captured image. For example, the control system may alter a course of the vehicle or alter a speed of the vehicle. Additionally, the control system may record the position of the vehicle detected in the image. The control system may calculate vehicle control signals based on vehicles detected within the field of view.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to capture an image with a camera in vehicle 100, analyze the image for the presence of a second vehicle, and responsively control vehicle 100 based on the presence of the turn signal indicator. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway map data 166, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data 166 stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
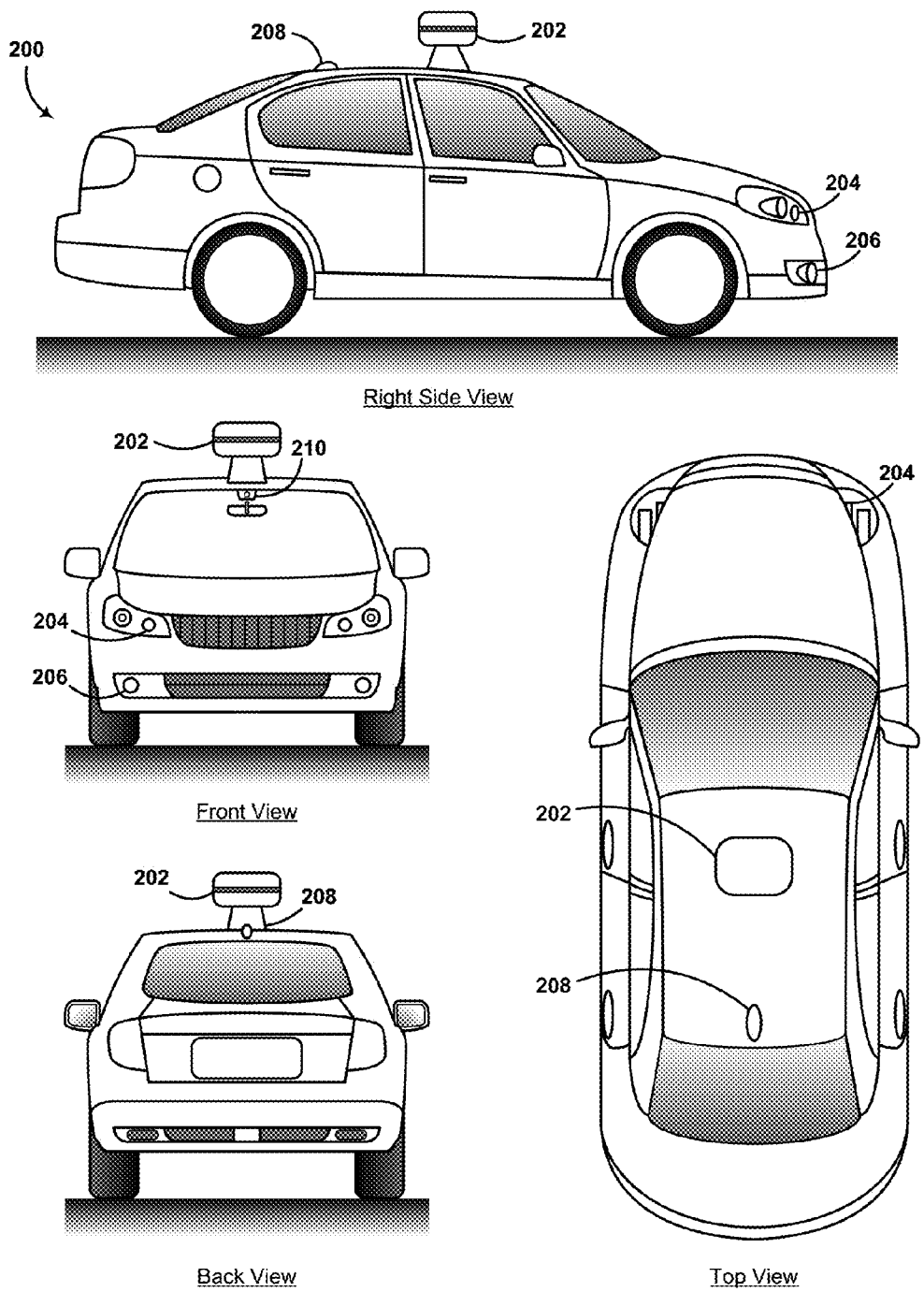
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 208, a radar 206, a laser rangefinder 204, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 204.

The wireless communication system 208 could be located as depicted in FIG. 2. Alternatively, the wireless communication system 208 could be located, fully or in part, elsewhere. The wireless communication system 208 may include wireless transmitters and receivers that could be configured to communicate with devices external or internal to the vehicle 200. Specifically, the wireless communication system 208 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
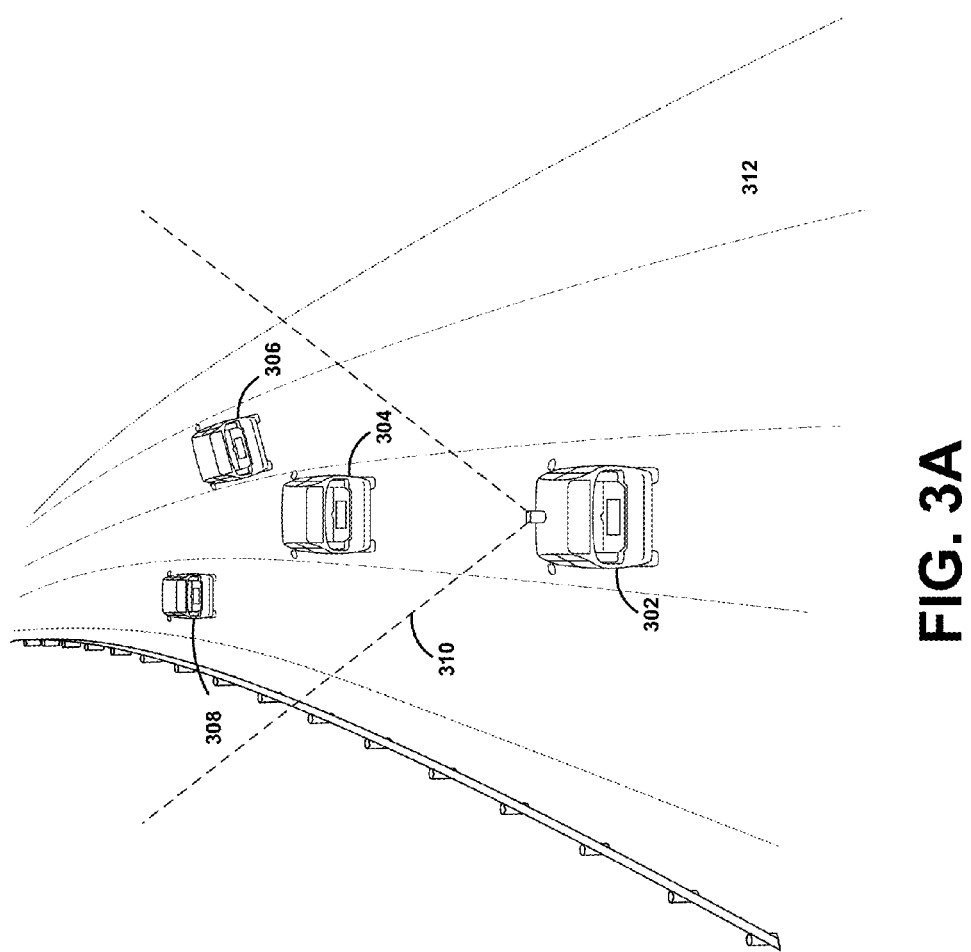
FIG. 3A illustrates an example field of view of a vehicle.

FIG. 3A illustrates an example field of view 310 of a vehicle 302. The vehicle 302 includes an imaging device, such as camera 134 as described with respect to FIG. 1. The camera on the vehicle 302 has an associated field of view 310. The field of view 310 depends on the specific camera that is used. The field of view 310 may be adjusted by changing the zoom level, focal length, or lens of the camera on the vehicle. For example, in some embodiments, the vehicle may include a camera with a telephoto lens. The telephoto lens enables the camera to zoom; however, the zoom reduces the field of view 310 of the camera.

As the vehicle 302 travels down a roadway 312, the field of view 310 of the camera may point in the direction of travel of the vehicle 302. Within the field of view 310 may be a plurality of vehicles. As shown in FIG. 1, vehicles 304, 306, and 308 are all within the field of view 310 of vehicle 302. The vehicles 304, 306, and 308 are all shown traveling in the same direction as vehicle 302; however, vehicles within the field of view 310 may be traveling in directions other than in the same direction as vehicle 302. For example, some of the vehicles within the field of view may be traveling towards vehicle 302 or perpendicular to vehicle 302. Additionally, vehicles 304 and 308 may be completely visible within the field of view 310 of vehicle 302. Conversely, within the field of view 310, vehicle 306 may be partially obstructed by the vehicle 304.

The camera of vehicle 302 is configured to either capture video or sill frames of the field of view 310. The captured images or video will later be processed to identify whether or not vehicles, such as vehicles 304, 306, and 308, are within the field of view 310 of vehicle 302.

Figure 3B:
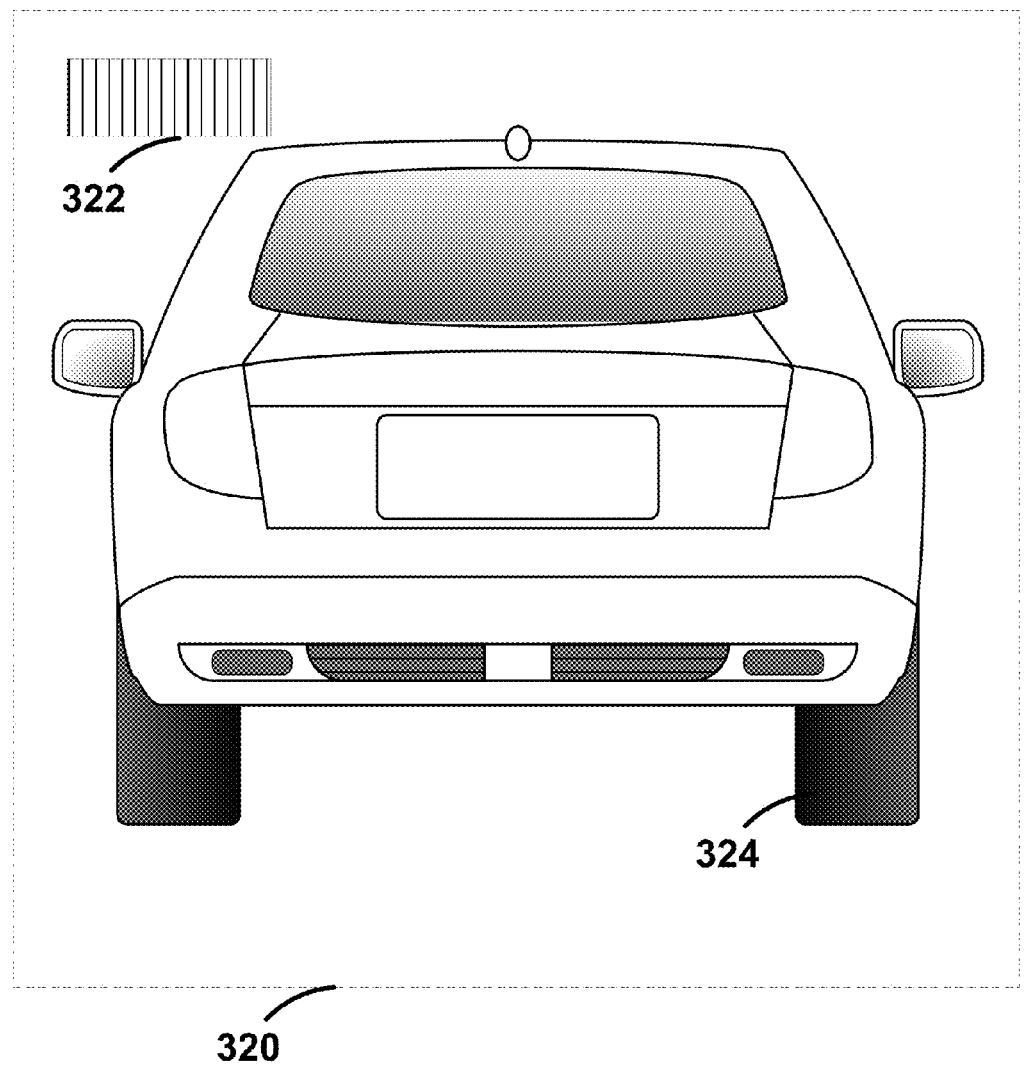
FIG. 3B illustrates a sliding-window filter within an image.

FIG. 3B illustrates a sliding window 322 within an image 320. The image 320 corresponds to an image captured of the field of view 310 of FIG. 3A. A processing system in the vehicle will analyze image 320 to determine if image 320 contains a depiction of a vehicle within the field of view of the camera of the vehicle.

The processing system in the vehicle detects vehicles in the image by first defining a sliding-window filter 322 for the captured image 320. The sliding-window filter 322 may take the form of a predefined number and arrangement of pixels. In one example, the sliding-window filter 322 may measure 20 pixels in the vertical direction and 100 pixels in the horizontal direction. The sliding-window filter 322 may also be varied in size and shape.

In one embodiment, the sliding-window filter 322 analyzes the color of the space contained within the sliding-window filter. The analysis may include determining the average color within the sliding-window filter 322. The analysis may also determine whether the sliding-window filter 322 contains substantially a single color. The color of the space within the sliding-window filter 322, the shape of the sliding-window filter 322, and the location of the sliding-window filter 322 define a region. A region of the capture image having a known size, shape, and color. A region may also be known as an integral image. An integral image is a data structure that allows for the fast computation of summations within an image. For example, a region here may be defined by the average color (on each color channel) within the sliding window of a given image. Thus, any given region (e.g. integral image) of a given image may have the average color within the region calculated.

The sliding-window filter 322 may iteratively analyze portions of the captured image by determining a color within the sliding-window filter, then moving to a new position on the image and determining the color within the sliding-window filter again. Thus, the sliding-window filter 322 may determine a plurality of regions based on a single captured image. This sliding-window filter process may be repeated over the entire image (e.g. the window slides across the image to determine a plurality of regions). In one embodiment, after each determination, the sliding-window filter 322 is adjusted by one (or more) pixel in either a vertical or horizontal direction. This process is repeated until the sliding-window filter cannot move further within the extent of the image (e.g. the sliding-window filter has scanned a full line). After a line has been scanned, the sliding-window filter 322 may return to the beginning of the line, but be adjusted by one (or more) pixel in a direction perpendicular to the scan line. In some embodiments, with each iteration, the pixel increment may be one pixel. However, in other embodiments, different value pixel increments may be used.

After a sliding-window filter 322 is scanned over the entire image 320, the sliding-window filter 322 may repeat the process with a differently shaped sliding-window filter. For example, the sliding-window filter 322 may be either increased or decreased in size. The scanning process may be repeated with the adjusted size of the sliding-window filter 322.

The sliding-window filter process may be performed with a predetermined set of sliding-window filter shapes and sizes. The predetermined set of sliding-window filter shapes and sizes may correspond to various features of vehicles that the sliding-window filter attempts to detect. For example, one specific sliding-window filter shape may be designed to detect rear taillights on vehicles in an image. In other examples, the sliding-window filter may be configured to detect other features of a vehicle, such as the bumper, rear window, tires, etc. In some embodiments, there may not be predetermined sliding-window filter sizes and shapes; rather, a computer system may determine the size and shape of the sliding-window filter. In some embodiments, the computer system may determine the size and shape of the sliding-window filter based on an analysis of the image. Additionally, the size and shape of the sliding-window filter may change depending on the location within the captured image that is currently being analyzed.

Figure 3C:
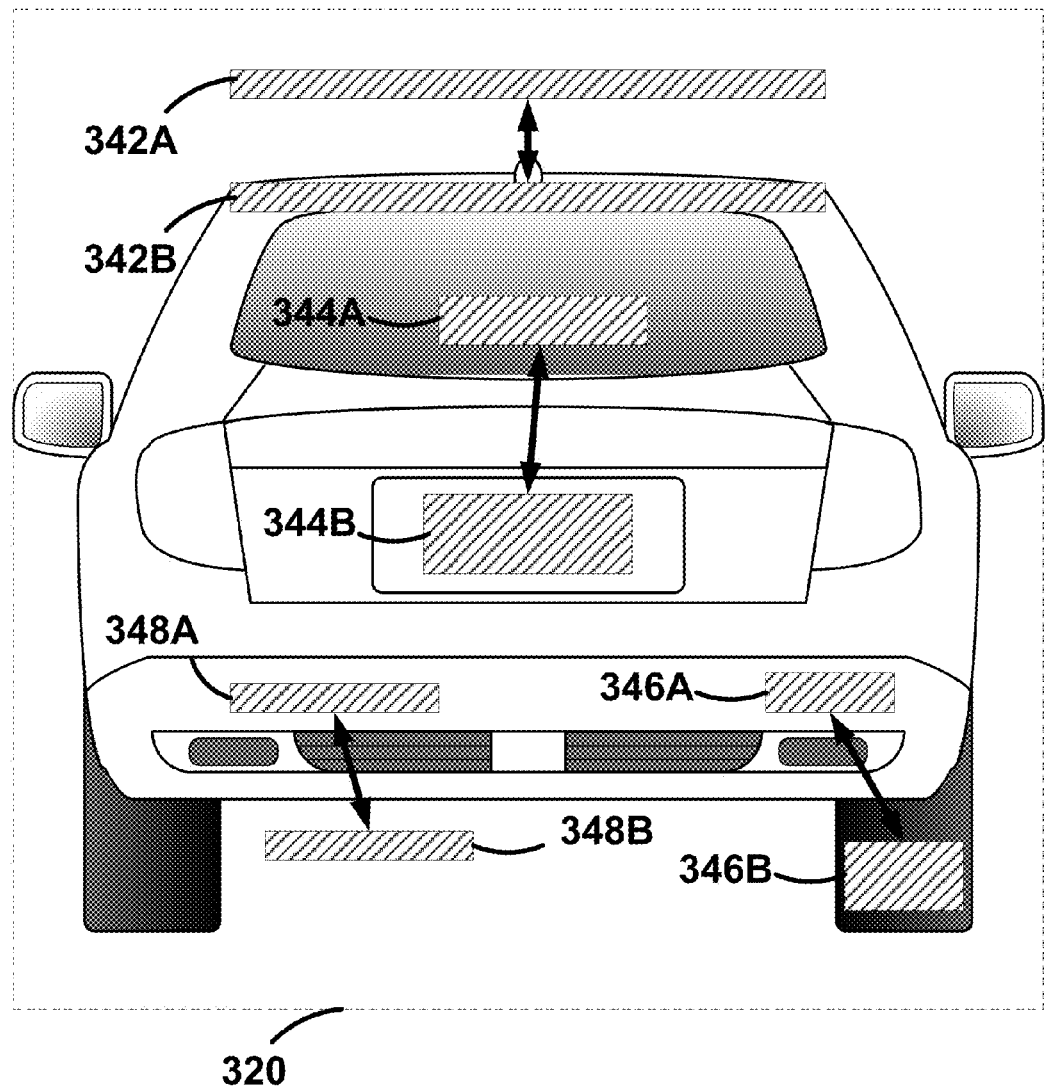
FIG. 3C illustrates various region-pairs within an image.

FIG. 3C illustrates various region-pairs (342A and 342B, 344A and 344B, 346A and 346B, and 348A and 348B) within an image 320. Two regions define each region-pair. The sliding-window filter described with respect to FIG. 3B defines each region. Each region-pair may be representative of a relationship between the two regions of the region-pair determined in part by a training algorithm. Additionally, the vehicle detection system may determine that image 320 possibly contains a vehicle based on an analysis of the region-pairs. The vehicle detection system will analyze a plurality of region-pairs to determine if image 320 possibly contains a vehicle.

In some embodiments, the vehicle detection system uses a weighted combination of the various region pairs to determine if image 320 possibly contains a vehicle. For example, in various embodiments, a region pair indicating a roofline and a sky above the vehicle may be weighted more heavily than a region pair indicating a rear tire and a license plate of the vehicle. Additionally, embodiments also include the vehicle detection system being configured to detect half of a vehicle (e.g either the left or right half of the vehicle). Detecting half of a vehicle is useful in situations where a portion of a vehicle is obstructed from view of the camera. An image may not be able to capture the full vehicle because it may be obstructed by another vehicle on the road or it may be obstructed by another object. If image 320 possibly contains a vehicle, the image will be processed further to determine whether or not a vehicle is present. The region-pairs of FIG. 3C are examples of various region-pairs that may be indicative of the presence of a vehicle.

The vehicle detection system may be programmed to interpret region-pairs as corresponding to a vehicle based on the training algorithm. An operator may indicate whether a vehicle is present in each training image. The training algorithm may be a learning algorithm in which many images are analyzed by randomly determining region-pairs. After a plurality of images are analyzed, the vehicle detection system will be able to determine which region-pairs (and the associated color of each respective region) are more likely to indicate the presence of a vehicle in an image. Some region-pairs have one region that corresponds to a region of the vehicle and one region that corresponds to a region that is not part of the vehicle. However, other region-pairs have both regions correspond to regions of the vehicle. Further, some of the region-pairs identified by the training algorithm may correspond to a vehicle that is partially obstructed. Thus, the vehicle detection system may be able to identify vehicles that are partially obstructed in an image.

The region-pair indicated by regions 342A and 342B corresponds to the roofline of the vehicle and the sky above the vehicle. When a vehicle is present in image 320, the vehicle detection system may use a sliding-window filter to identify a first region 342A that corresponds to the sky. The vehicle detection system may use the sliding-window filter to additionally identify a second region 342B that corresponds to the roofline of the vehicle. The vehicle detection system may determine there is possibly a car in image 320 when the region-pair indicated by regions 342A and 342B has a color corresponding to the vehicle color in region 342B and a color corresponding to the color of the sky in region 342A. If the colors of the two regions 342A and 342B correspond to the color of the sky and the color of the car respectively, the image 320 may contain a car. Additionally, because region 342B corresponds to a part of the car and region 342A does not correspond to part of the car, the vehicle detection system may attempt to detect an edge of the vehicle between the two regions. If there is an edge between the two regions 342A and 342B, the likelihood that image 320 contains a car increases. Examining the differences in average color between the two regions may determine whether an edge exists between the two regions.

The region-pair indicated by regions 344A and 344B corresponds to the rear windshield of the vehicle and the license plate region of the vehicle. When a vehicle is present in image 320, the vehicle detection system may use a sliding-window filter to identify a first region 342A that corresponds to the rear windshield. The vehicle detection system may use the sliding-window filter to additionally identify a second region 342B that corresponds to the license plate region of the vehicle. The vehicle detection system may determine there is possibly a car in image 320 when the region-pair indicated by regions 344A and 344B has a color corresponding to the color of a window in region 344A and a color corresponding to the color of a license plate in region 344B. If the colors of the two regions 344A and 344B correspond to the color of the window and the color of the license plate respectively, the image 320 may contain a car.

The region-pair indicated by regions 346A and 346B corresponds to the rear bumper of the vehicle and the rear tire of the vehicle. When a vehicle is present in image 320, the vehicle detection system may use a sliding-window filter to identify a first region 342A that corresponds to the rear bumper. The vehicle detection system may use the sliding-window filter to additionally identify a second region 342B that corresponds to the rear tire of the vehicle. The vehicle detection system may determine there is possibly a car in image 320 when the region-pair indicated by regions 346A and 346B has a color corresponding to the color of a rear bumper in region 346A and a color corresponding to the color of a rear tire in region 346B. If the colors of the two regions 346A and 346B correspond to the color of the rear bumper and the color of the rear tire plate respectively, the image 320 may contain a car.

The region-pair indicated by regions 348A and 348B corresponds to the rear bumper of the vehicle and the ground below the vehicle. When a vehicle is present in image 320, the vehicle detection system may use a sliding-window filter to identify a first region 348A that corresponds to the rear bumper. The vehicle detection system may use the sliding-window filter to additionally identify a second region 348B that corresponds to the ground below the vehicle. The vehicle detection system may determine there is possibly a car in image 320 when the region-pair indicated by regions 348A and 348B has a color corresponding to the rear bumper color in region 348B and a color corresponding to the color of the ground below the vehicle in region 348A. If the colors of the two regions 348A and 348B correspond to the color of the rear bumper and the color of the ground below the vehicle respectively, the image 320 may contain a car. Additionally, because region 348A corresponds to a part of the car and region 348B does not correspond to part of the car, the vehicle detection system may attempt to detect an edge of the vehicle between the two regions. If there is an edge between the two regions 348A and 348B, the likelihood that image 320 contains a car increases.

Figure 3D:
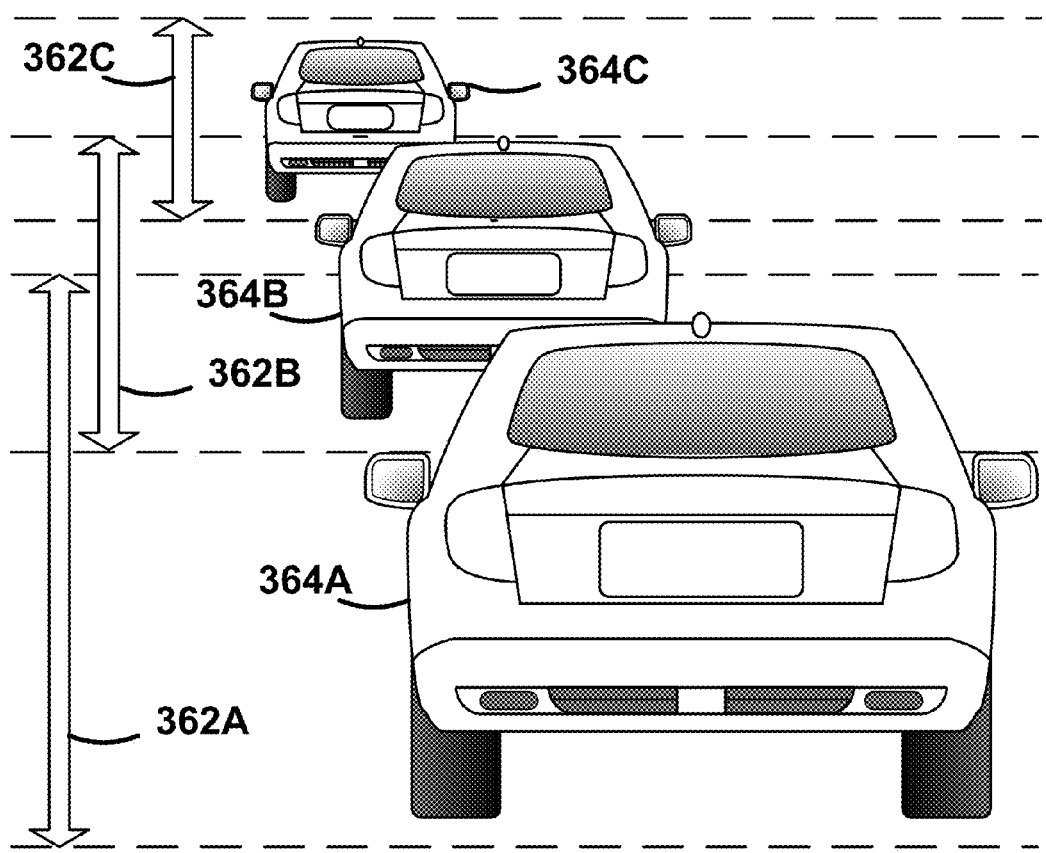
FIG. 3D illustrates an example field-of-view optimization.

FIG. 3D illustrates an example field-of-view optimization for the sliding-window filter process. When an image is captured, the relative size of various vehicles depends on the distance each vehicle is from the image-capture device. As a vehicle is located further away from the image-capture device, the vehicle will appear smaller in the captured image. Additionally, as a vehicle is located further away from the image-capture device, it will generally appear higher up in the captured image. Therefore, knowing the size and location of vehicles within a captured image is dependent on the distance each vehicle is from the image capture device, the size of the sliding-window filter (discussed with respect to FIG. 3A) may be adjusted to more efficiently detect vehicles within the image.

In one example, a captured image may have three regions, 362A-362C. Each region may correspond to vehicles located a different distances away from the image capture device. Region 362A corresponds to the closest distance to the image capture device. Therefore, vehicle 364A, located in region 362A, appears to the largest and in the lowest position in the captured image. Region 362C corresponds to the furthest distance to the image capture device. Consequently, vehicle 364C, located in region 362C, appears to the smallest and in the highest position in the captured image. Region 362B corresponds to a distance between region 362A and region 362C. Thus, vehicle 364B, located in region 362B, appears to be in between the size of vehicle 364A and vehicle 364C. Additionally, vehicle 364B is generally positioned between vehicle 364A and vehicle 364C in the captured image.

The training algorithm may be able to determine appropriate sized sliding-window filters based on a location within the captured image. The training algorithm may determine how to adjust the size and shape of the sliding-window filter to determine features of a vehicle depending on the position within the sliding-window filter. For example, after a the training algorithm is run on a plurality of images, it may perform a correlation on various region-pairs and determine a function to describe the change in shape for the sliding-window filter as it moves on the image.

Figure 4:
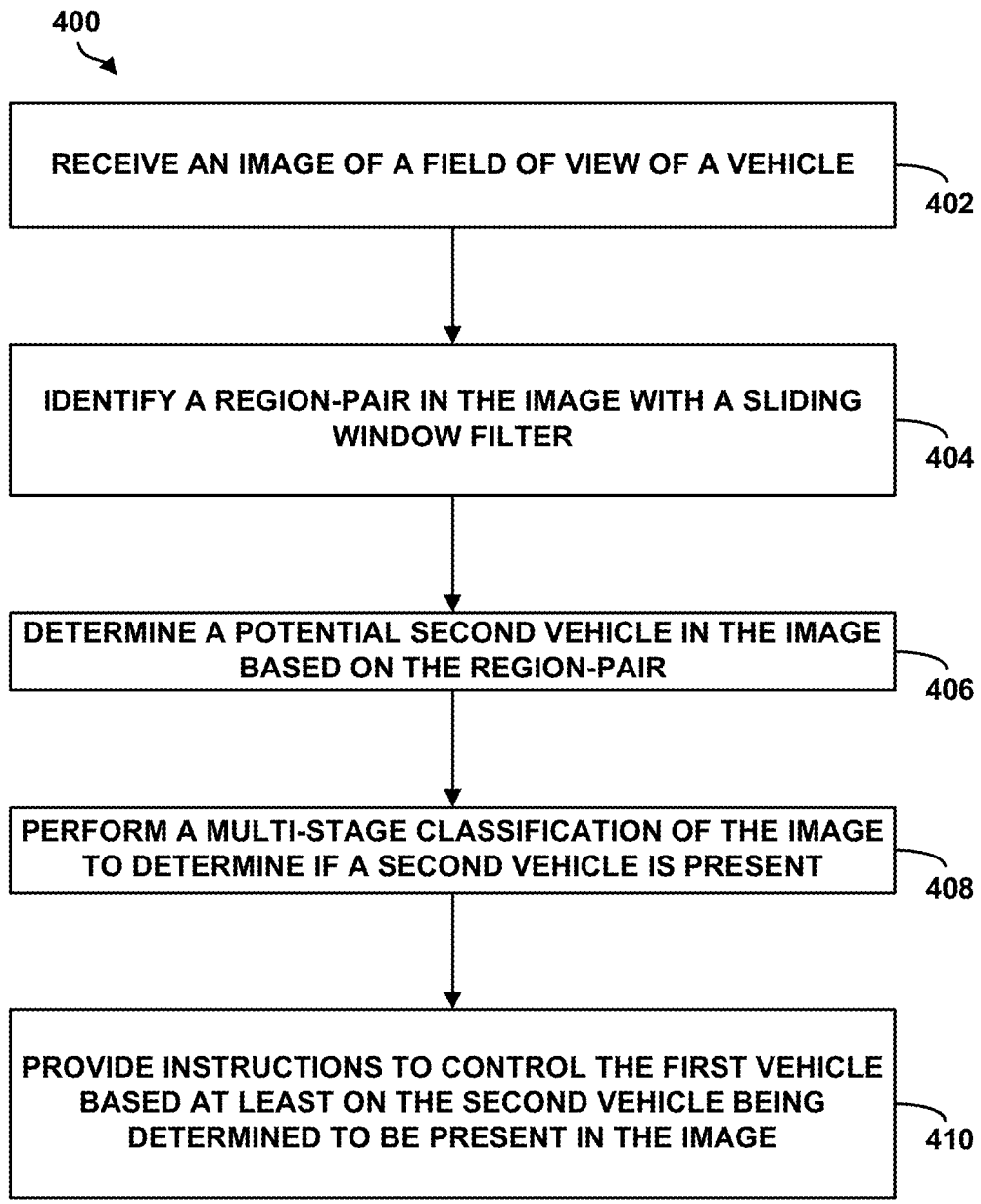
FIG. 4 illustrates an example method for real-time image-based car detection.

A method 400 is provided for real-time image-based car detection for the self-driving car. The method could be performed to detect vehicles in images, similar to what was described with respect to FIGS. 3A-3D; however, the method 400 is not limited to the scenarios shown in FIGS. 3A-3D. FIG. 4 illustrates the blocks in an example method for real-time image-based car detection for the self-driving car. However, it is understood that in other embodiments, the blocks may appear in different order and blocks could be added, subtracted, or modified. Additionally, the blocks may be performed in a linear manner (as shown) or may be performed in a parallel manner (not shown).

Block 402 includes receiving an image of a field of view of a vehicle. As previously discussed, the autonomous vehicle includes an imaging system. The imaging system is configured to capture either (i) still images or (ii) video of a field of view in front of the vehicle. The imaging system stores the captured image or data as data in a memory. At block 402, the images may be received from the memory for processing. In additional embodiments, at block 402, images may be received directly from the imaging system. However, in both embodiments, data representative of an image (or a video) is received for processing. If the data corresponds to a video, a single frame may be extracted from the video for analysis. Additionally, multiple frames of video may be analyzed either sequentially or in parallel.

Block 404 includes identifying a region-pair in the image with a sliding-window filter. The region-pair may be identified with a sliding-window filter similar to that described with respect to FIG. 3B. In some embodiments, block 404 identifies a plurality of region-pairs within the image by the method described herein. A processing system in the vehicle will analyze image received at block 402 by defining a first sliding-window filter for the captured image. The computing device uses the sliding-window filter to iteratively analyze the color of the space contained within the sliding-window filter and changes position on the image. The analysis by the sliding-window filter may include determining the average color within the sliding-window filter. The analysis by the sliding-window filter may also determine whether the sliding-window filter contains substantially a single color. The color of the space within the sliding-window filter, the shape of the sliding-window filter, and the location of the sliding-window filter define a region. A region of the capture image has a known size, shape, and color.

The computing devices use the sliding-window filter to iteratively analyze portions of the captured image by determining a color within the sliding-window filter, then moving to a new position on the image and determining the color within the sliding-window filter again. Thus, the sliding-window filter determines a plurality of regions based on a single captured image. This sliding-window filter process may be repeated over the entire image. After a sliding-window filter is scanned over the entire image, the sliding-window filter may repeat the process with a differently shaped sliding-window filter.

As previously stated, the sliding-window filter process may be performed with a predetermined set of sliding-window filter shapes and sizes. The predetermined set of sliding-window filter shapes and sizes may correspond to various features of vehicles that the sliding-window filter attempts to detect. Additionally, the size and shape of the sliding-window filter may change depending on the location within the captured image that is currently being analyzed.

Each region-pair is then defined by two regions. Each region-pair may be representative of a relationship between the two regions of the region-pair. As previously discussed, the vehicle detection system may be programmed to define region-pairs based on a training algorithm. An operator may indicate whether a vehicle is present in each training image. The training algorithm may be a learning algorithm in which many images are analyzed by randomly determining region-pairs. After a plurality of images are analyzed, the vehicle detection system will be able to determine which region-pairs are more likely to indicate the presence of a vehicle in an image. Once the system has been trained, it automatically defines region-pairs in an image based on the training.

Block 406 includes determining a potential second vehicle in the image based on the region-pair. For purposes of discussion, the vehicle that captures the image is the first vehicle and a potential vehicle captured in the image is a potential second vehicle. Block 406 is a low-computationally intensive pre-qualification for the presence of a vehicle. If a potential vehicle is not determined at block 406, method 400 does not continue. However, if a potential vehicle is determined at block 406, a more computationally intensive vehicle detection system may be used with the image. Therefore, the pre-qualification lowers the overall computational requirement for detecting vehicles.

The potential second vehicle is determined based on an analysis of at least one region-pairs determined at block 404. In some embodiments, block 404 determines a plurality of region-pairs. In this embodiment, block 406 may determine a potential second vehicle based on an analysis of at least a subset if not all of the plurality of region-pairs.

An analysis of the region-pairs will allow the vehicle detection system to determine if the image contains either no vehicles or potentially one (or more) vehicle. In some embodiments, the vehicle detection system compares the various identified region-pairs to region-pairs previously identified in training. In other embodiments, once the vehicle detection system learning algorithm has been trained, the vehicle detection system can analyze each region-pair to determine whether each individual region-pair indicates the presence of a possible vehicle.

The vehicle detection system will analyze the region-pairs to determine either (i) there is no vehicle in the image or (ii) there is a possible vehicle in the image. If the determination is made that there is no vehicle in the image, the vehicle detection system will stop analyzing the image. However, if the determination is made that there is a possible vehicle in the image, the image may be further processed with a multi-stage classification.

Block 408 includes performing a multi-stage classification of the image to determine if a second vehicle is present. The multi-stage classification of the image includes the method performing a plurality of classifications on the image. Each classification performs a more advanced and computationally intensive vehicle detection. Example computationally intensive vehicle detection used by the classifiers includes detailed color and edge analysis of a captured image.

Additionally, various classifiers may be used based on specific detection capabilities. For example, some classifiers may detect based on image features, such as edge detectors or histogram of orientated gradient (HOG) detectors. Each classifier may be performed on the image as a whole, or within specific regions of the image. Further, classifiers may operate on the image in full-color or on a subset of the available colors. Additionally, some classifiers may attempt to detect vehicles based on a combination of various feature detection capabilities. In additional embodiments, the multi-stage classification may take the form of a decision tree, a support vector machine, a neural network, a boosted cascade, or other detection model.

At block 410, the method 400 includes controlling the first vehicle based on the modified control strategy. In an example, a computing device may be configured to control actuators of the first vehicle using an action set or rule set associated with the modified control strategy. For instance, the computing device may be configured to adjust translational velocity, or rotational velocity, or both, of the vehicle based on the modified driving behavior. In additional examples, the computing device may alter a course of the vehicle or alter a speed of the vehicle. Additionally, the computing device may record the position of the vehicle detected in the image. The computing device may calculate vehicle control signals based on vehicles detected within the field of view.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 112) may provide functionality or portions of the functionality described above with respect to FIGS. 1-4. Thus, for example, referring to the embodiments shown in FIG. 4, one or more features of blocks 402-410 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, from an image-capture device coupled to a first vehicle, an image of a field of view of the first vehicle;
identifying a plurality of region-pairs in the image with a sliding-window filter, wherein each region-pair comprises a first region of the image and a second region of the image, wherein each region of the image is determined based on a color of pixels within the sliding-window filter;
determining a potential second vehicle in the image based on the plurality of region-pairs;
in response to determining a presence of the potential second vehicle in the image, performing a multi-stage classification of the image as a whole to determine whether the second vehicle is present in the image, wherein the multi-stage classification is ended based on a given stage resulting in a determination of absence of the second vehicle in the image, wherein each stage of the multi-stage classification comprises a car-detection function configured to detect a car in the image; and
providing instructions to control, using a computing device, the first vehicle based at least on the second vehicle being determined to be present in the image.

2. The method of claim 1, wherein the sliding-window filter defines a plurality of regions based on the color of pixels within the sliding-window filter.

3. The method of claim 1, wherein determining a potential second vehicle comprises comparing a difference in the color of pixels between the first region and the second region.

4. The method of claim 1, wherein determining a potential second vehicle comprises detecting an edge of the second vehicle between the first region and the second region.

5. The method of claim 1, wherein a size of the sliding-window filter is based on a location on the image.

6. The method of claim 1, wherein multi-stage classification of the image comprises performing a plurality of classifications of the image, wherein each subsequent classification performs a more advanced and computationally intensive vehicle detection.

7. The method of claim 1, wherein providing instructions to control comprises providing instructions to perform one or more of: reducing a speed of the first vehicle, maintaining a predetermined safe distance from the second vehicle, avoiding being in a blind spot of the second vehicle, changing lanes to move away from the second vehicle, and stopping the first vehicle.

8. A control system comprising:
   at least one processor; and
   a memory having stored thereon instructions that, upon execution by the at least one processor, cause the control system to perform functions comprising:
   receiving, from an image-capture device coupled to a first vehicle, an image of a field of view of the first vehicle;
   identifying a plurality of region-pairs in the image with a sliding-window filter, wherein each region-pair comprises a first region of the image and a second region of the image, wherein each region of the image is determined based on a color of pixels within the sliding-window filter;
   determining a potential second vehicle in the image based on the plurality of region-pairs;
   in response to determining a presence of the potential second vehicle in the image, performing a multi-stage classification of the image as a whole to determine whether the second vehicle is present in the image, wherein the multi-stage classification is ended based on a given stage resulting in a determination of absence of the second vehicle in the image, wherein each stage of the multi-stage classification comprises a car-detection function configured to detect a car in the image; and
   providing instructions to control, using a computing device, the first vehicle based at least on the second vehicle being determined to be present in the image.

9. The control system of claim 8, wherein determining a potential second vehicle comprises comparing the color difference in the color of pixels between the first region and the second region.

10. The control system of claim 8, wherein determining a potential second vehicle comprises detecting an edge of the second vehicle between the first region and the second region.

11. The control system of claim 8, wherein a size of the sliding-window filter is based on a location on the image.

12. The control system of claim 8, wherein classifying the image comprises performing a plurality of classifications of the image, wherein each subsequent classification performs a more advanced and computationally intensive vehicle detection.

13. The control system of claim 8, providing instructions to control comprises providing instructions to perform one or more of: reducing a speed of the first vehicle, maintaining a predetermined safe distance from the second vehicle, avoiding being in a blind spot of the second vehicle, changing lanes to move away from the second vehicle, and stopping the first vehicle.

14. A non-transitory computer readable medium having stored thereon instructions, that when executed by a computing device, cause the computing device to perform functions comprising:
   receiving, from an image-capture device coupled to a vehicle, an image of a field of view of the first vehicle;
   identifying a plurality of region-pairs in the image with a sliding-window filter, wherein each region-pair comprises a first region of the image and a second region of the image, wherein each region of the image is determined based on a color of pixels within the sliding-window filter;
   determining a potential second vehicle in the image based on the plurality of region-pairs;
   in response to detecting a presence of a potential second vehicle, performing a multi-stage classification of the image as a whole to determine whether the second vehicle is present in the image, wherein the multi-stage classification is ended based on a given stage resulting in a determination of absence of the second vehicle in the image, wherein each stage of the multi-stage classification comprises a car-detection function configured to detect a car in the image; and
   providing instructions to control the vehicle based at least on the determined second vehicle.

15. The non-transitory computer readable medium of claim 14, wherein the sliding-window filter defines a plurality of regions based on the color of pixels within the sliding-window filter, and wherein each region-pair comprises a first region and a second region.

16. The non-transitory computer readable medium of claim 14, wherein detecting a potential second vehicle comprises comparing the color difference between the first region and the second region.

17. The non-transitory computer readable medium of claim 14, wherein detecting a potential second vehicle comprises detecting an edge of the second vehicle between the first region and the second region.

18. The non-transitory computer readable medium of claim 14, wherein the size of the sliding-window filter operates as a function of a location on the image.

19. The non-transitory computer readable medium of claim 14, wherein classifying the image comprises performing a plurality of classifications of the image, wherein each subsequent classification performs a more advanced and computationally intensive vehicle detection.

20. The non-transitory computer readable medium of claim 14, wherein providing instructions to control comprises providing instructions to perform one or more of: reducing a speed of the first vehicle, maintaining a predetermined safe distance from the second vehicle, avoiding being in a blind spot of the second vehicle, changing lanes to move away from the second vehicle, and stopping the first vehicle.

* * * * *